US012193983B2

(12) United States Patent
Contardi

(10) Patent No.: US 12,193,983 B2
(45) Date of Patent: Jan. 14, 2025

(54) MODULAR CHIROPRACTIC TOOL

(71) Applicant: Brittany Contardi, Merritt Island, FL (US)

(72) Inventor: Brittany Contardi, Merritt Island, FL (US)

( * ) Notice: Subject to any disclaimer, the term of this patent is extended or adjusted under 35 U.S.C. 154(b) by 0 days.

(21) Appl. No.: 18/630,836

(22) Filed: Apr. 9, 2024

(65) Prior Publication Data

US 2024/0382363 A1 Nov. 21, 2024

Related U.S. Application Data

(60) Provisional application No. 63/466,834, filed on May 16, 2023.

(51) Int. Cl.
*A61H 1/00* (2006.01)
*A61H 1/02* (2006.01)
*A61H 23/02* (2006.01)

(52) U.S. Cl.
CPC ........... *A61H 1/008* (2013.01); *A61H 1/0296* (2013.01); *A61H 23/02* (2013.01); *A61H 2201/0107* (2013.01); *A61H 2201/0126* (2013.01); *A61H 2201/0153* (2013.01); *A61H 2201/1269* (2013.01); *A61H 2201/1611* (2013.01); *A61H 2201/1645* (2013.01)

(58) Field of Classification Search
CPC ...... A61H 1/008; A61H 1/0296; A61H 23/02; A61H 2201/0107; A61H 2201/0126; A61H 2201/0153; A61H 2201/1269; A61H 2201/1611; A61H 2201/1645; A63B 21/4003; A63B 21/169; A63B 23/025
See application file for complete search history.

(56) References Cited

U.S. PATENT DOCUMENTS 4,869,240 A * 9/1989 Boren .................. A61H 1/0229 602/32
5,242,347 A * 9/1993 Keeton ................ A63B 21/063 482/142
5,344,437 A * 9/1994 Pistay ....................... A61F 7/10 5/639
5,857,949 A * 1/1999 Tebbe ................ A63B 23/0211 482/131
7,255,666 B2 * 8/2007 Cardenas ................. A63B 7/02 482/69
7,901,327 B2 * 3/2011 Hargis ................. A61H 1/0296 601/39

(Continued)

*Primary Examiner* — Tu A Vo
*Assistant Examiner* — Kelsey E Baller
(74) *Attorney, Agent, or Firm* — Bullock Law; Stephen Bullock

(57) ABSTRACT

Embodiments of the present invention are related to a modular chiropractic tool with an arched vibrational cylinder, a gripping bar, a mounting plate, a left extension line, a right extension line, and a medial extension line. The medial extension line is removably engaged to the gripping bar at one end and removably engaged to the mounting plate at an opposing end. The left extension line and right extension line removably engage the arched vibrational cylinder at one end and removably engage the gripping bar at respective opposing ends. The modular chiropractic tool is structured to assist a user in a variety of vibrational adjustment exercises applied to the user's neck and upper spine.

12 Claims, 11 Drawing Sheets

(56) References Cited

U.S. PATENT DOCUMENTS

| | | | | |
|---|---|---|---|---|
| 8,657,774 | B1 * | 2/2014 | Fisher | A61H 1/0296<br>602/32 |
| 9,615,682 | B1 * | 4/2017 | Maddocks | B60N 2/5664 |
| 9,789,350 | B1 * | 10/2017 | Wu | A63B 21/0442 |
| 9,962,575 | B2 * | 5/2018 | Askins | A63B 23/025 |
| 2007/0213186 | A1 * | 9/2007 | Longo | A63B 21/0552<br>482/121 |
| 2014/0200499 | A1 * | 7/2014 | Champion | A63B 21/4009<br>602/36 |
| 2018/0028389 | A1 * | 2/2018 | Adimari | A61H 1/0229 |
| 2018/0085245 | A1 * | 3/2018 | Kovacevic | A61H 1/0292 |
| 2018/0161192 | A1 * | 6/2018 | Sudell | A61F 5/055 |
| 2018/0178050 | A1 * | 6/2018 | Prihar | A63B 21/4035 |
| 2019/0099316 | A1 * | 4/2019 | Pickman | A61H 1/0229 |
| 2020/0214481 | A1 * | 7/2020 | Sexton | A61H 1/0218 |
| 2021/0346238 | A1 * | 11/2021 | Menguy | A61H 23/0263 |

* cited by examiner

MODULAR CHIROPRACTIC TOOL

FIELD OF THE INVENTION

The present invention relates to chiropractic tools for massaging and stretching the back, neck and head areas. In particular, the present invention relates to a modular chiropractic tool and associated methods.

BACKGROUND

Chiropractic healthcare is a form of complementary medicine based on the diagnosis and manipulative treatment of misalignments of the joints, especially those of the spinal column, which are believed to cause other disorders by affecting the nerves, muscles, and organs. Oftentimes treatment comes in the form of realigning the joints to overcome these disorders. Realignment can come from chiropractic physicians themselves or in the form of at home exercises. However, at home exercises more often than not involve either convoluted maneuvers or a variety of separate tools.

There exists a need in the art for a modulated tool that can assist with chiropractic exercises such as traction of the upper spine, neck and head area to reverse issues such as negative curvature in the cervical spine that may be caused by technology use from computers, cell phones, and the like. There is a need for a tool that combines several methods, but allows a user to perform the exercises in the comfort of their own home. Therefore, there exists a need for a modulated chiropractic tool as shown and described herein.

SUMMARY OF THE INVENTION

Embodiments of the present invention are related to a modular chiropractic tool with an arched vibrational cylinder, a gripping bar, a mounting plate, a left extension line, a right extension line, and a medial extension line. The medial extension line may be removably engaged to the gripping bar at one end and removably engaged to the mounting plate at an opposing end. The left extension line and right extension line may removably engage the arched vibrational cylinder at one end and removably engage the gripping bar at respective opposing ends. The modular chiropractic tool may be structured to assist a user in a variety of vibrational adjustment exercises applied to the user's neck and upper spine.

The mounting plate may be structured to allow a user to utilize the modular chiropractic tool in a hands-free exercise while connected to a wall and the gripping bar may include a pair of grips at opposing ends and may be structured to allow a user to utilize the modular chiropractic tool with their hands while it is disconnected from a wall. Similarly, the arched vibrational cylinder may be structured as a stand-alone hands-free chiropractic tool when disconnected from the wall and the gripping bar.

In this embodiment, the extension lines may include opposing loop ends, each loop end fixedly attached to one end of an o-ring clip. The extension lines may removably engage with the gripping bar, mounting plate, and arched vibrational cylinder via the clips of the o-ring clips. Furthermore, the medial extension line may be removably engaged to an attachment ring centrally positioned on the gripping bar and the left and right extension lines may be removably engaged to a pair of flanking attachment rings oriented 180 degrees around the gripping bar from the centrally positioned attachment ring.

Another embodiment of the invention includes a modular chiropractic tool with an arched vibrational cylinder, a gripping bar, a mounting plate, a left extension line and a right extension line, and a medial extension line, whereby the medial extension line may be removably engaged to the gripping bar at one end and removably engaged to the mounting plate at an opposing end. The left extension line and right extension line may removably engage the arched vibrational cylinder at one end and removably engage the gripping bar at respective opposing ends. The mounting plate may be structured to allow a user to utilize the modular chiropractic tool in a hands-free exercise while connected to a wall and the gripping bar may be structured to allow a user to utilize the modular chiropractic tool with their hands while it is disconnected from a wall. The arched vibrational cylinder may be structured as an independent hands-free chiropractic tool when disconnected from the wall and the gripping bar.

In this embodiment, the arched vibrational cylinder may include an inner shell and an outer shell structured to encapsulate electrical componentry positioned therebetween. The arched vibrational cylinder may include at least one vibrational motor and a plurality of power sources structured to vibrate the vibrational cylinder. The arched vibrational inner shell may include a neck pad. It may also include end caps with attachment rings for removably engaging the left extension line and a right extension line.

The left, right, and medial extension lines may be removably engaged via o-ring clasps at opposing ends and may fixedly loop through the o-ring clasps at respective opposing ends. The arched vibrational cylinder may include a plurality of vibrational motors between an inner and outer shell. Furthermore, the arched vibrational cylinder may be controlled by either a power button located thereon or communication with a remotely paired wireless device.

In another embodiment, the modular chiropractic tool includes an arched vibrational cylinder with an inner shell, an outer shell, a vibrational diffuser positioned between the inner and outer shells, at least one power source and one vibrational motor positioned on the vibrational diffuser. It may have a gripping bar, a mounting plate, and a left, right and medial extension line. The medial extension line may be removably engaged to the gripping bar at one end and removably engaged to the mounting plate at an opposing end. The left extension line and right extension line may removably engage the arched vibrational cylinder at one end and removably engage the gripping bar at respective opposing ends. The tool itself may be structured to assist a user in a variety of vibrational adjustment exercises applied to the user's neck and upper spine.

In this embodiment, the mounting plate may be structured to allow a user to utilize the modular chiropractic tool in a hands-free exercise while connected to a wall, and the gripping bar may be structured to allow a user to utilize the modular chiropractic tool with their hands while it is disconnected from a wall. The arched vibrational cylinder may be structured as an independent hands-free chiropractic tool when disconnected from the wall and the gripping bar.

DETAILED DESCRIPTION OF THE INVENTION

The present invention will now be described in detail with reference to the accompanying drawings. The embodiment descriptions are illustrative and not intended to be limiting in any way. Other embodiments of the invention will readily suggest themselves to persons with ordinary skill in the art after having the benefit of this disclosure. Accordingly, the following embodiments are set forth without any loss of generality and without imposing limitation upon the claimed invention.

Directional terms such as “above” “below” “upper” “lower” and other like terms are used for the convenience of the reader in reference to the drawings. Additionally, the description may contain terminology to convey position, orientation, and direction without departing from the principles of the present invention. Such positional language should be taken in context of the represented drawings.

Quantitative terms such as “generally” “substantially” “mostly” and other like terms are used to mean that the referred object, characteristic, or quality constitutes a majority of the referenced subject. Likewise, use of the terms such as first and second do not necessarily designate a limitation of quantity. Such terms may be used as a method of describing the presence of at least one of the referenced elements or may provide a means of differentiating orientation. The meaning of any term within this description is dependent upon the context within which it is used, and the meaning may be expressly modified.

Figure 1:
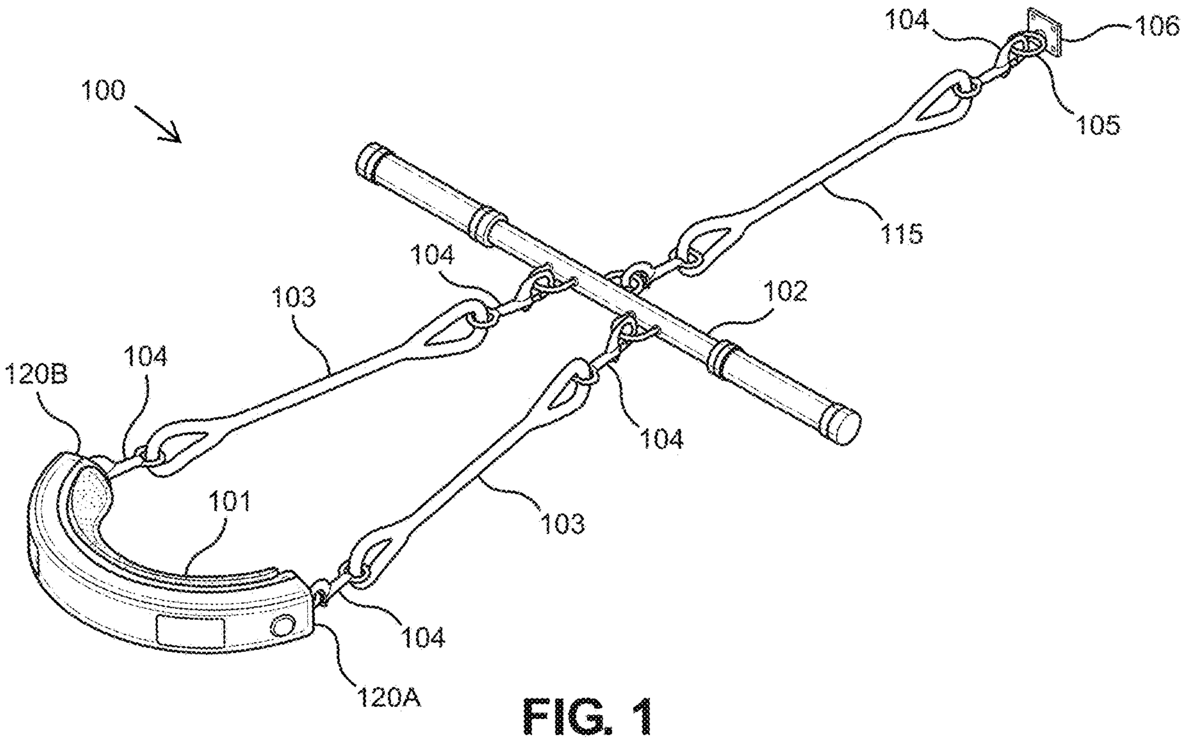
FIG. 1 is a front perspective view of the modular chiropractic tool according to an embodiment of the invention.
Figure 2:
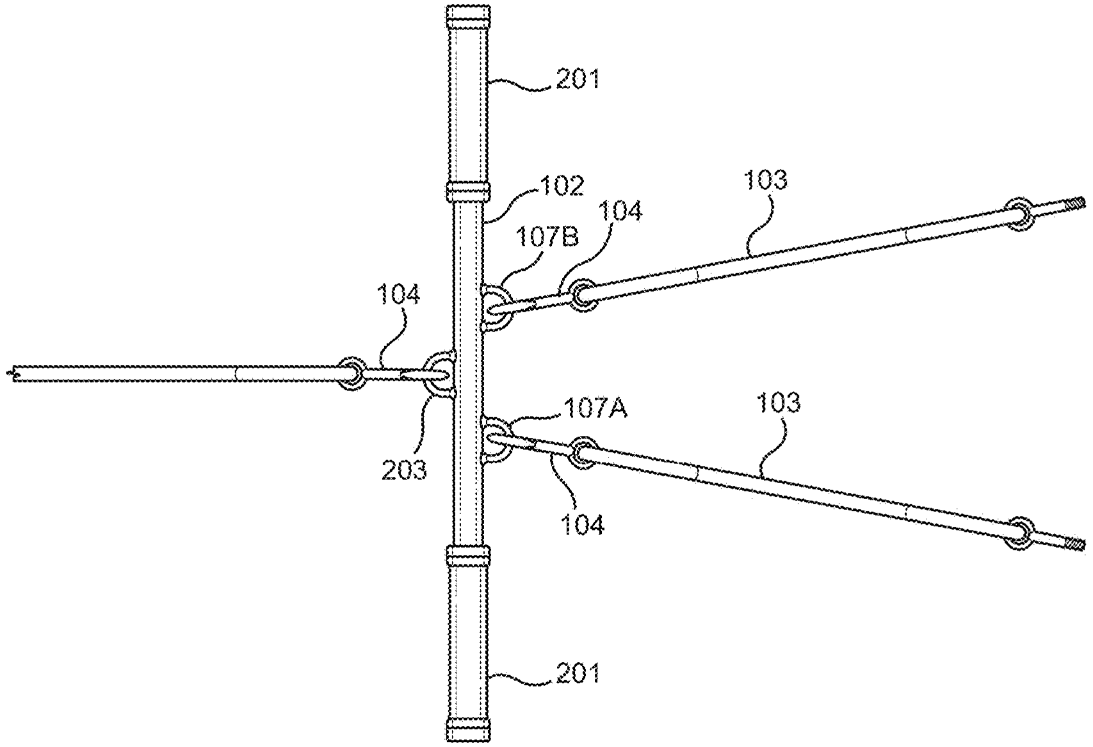
FIG. 2 is a top view of the modular chiropractic tool illustrated in FIG. 1.

FIGS. 1 and 2 illustrate a front perspective view and top view of the modular chiropractic tool 100, hereinafter the tool 100, structured to assist a user in a variety of vibrational adjustment exercises applied to the user’s neck and upper spine. As shown, the tool 100 may include an arched vibrational cylinder 101, a gripping bar 102, left and right extension lines 103, and a medial extension line 115. The gripping bar 102 may include a pair of hand grips 201 at opposing ends structured to facilitate a user grabbing and extending the gripping bar 102 away from their neck. In some embodiments, the hand grips 201 may be fitted cylinders placed overtop the gripping bar 102 and in some embodiments, they may be made as an integral part of the gripping bar 102.

The left and right extension lines 103 may be removably engaged to the arched vibrational cylinder 101 each at one end via o-ring clasps 104. These o-ring clasps 104 may clasp to attachment rings 107*a*, 107*b* at opposing ends 120A, 120B of the arched vibrational cylinder 101. The left and right extension lines 103 at the ends may also be removably engaged to the gripping bar 102. In some embodiments, the medial extension line 115 may be removably engaged to an attachment ring 203 centrally positioned on the gripping bar 102 and the left and right extension lines 103 may be removably engaged to a pair of flanking attachment rings 107A, 107B oriented 180 degrees around the gripping bar 102 from the centrally positioned attachment ring 203. All extension lines 103, 115 may include opposing loop ends, each loop end fixedly attached to one end of an o-ring clip 104 giving them removable engagement with the other components of the tool 100. As such, the opposing end of the medial extension line 115 relative to the gripping bar 102 may include another o-ring clip 104 removably attached to a mounting ring 105 that may be attached to a mounting plate 106. The mounting plate 106 may be structured to allow a user to utilize the tool 100 in a hands-free exercise while connected to a wall. Furthermore, the gripping bar 102, mounting plate 106, and arched vibrational cylinder 101 may removably engage the extension lines 103, 115 via the clips of the o-ring clips 104.

The arched vibrational cylinder 101 may be an elongate and arched cylindrical member with two endcaps 120*a*, 120*b* at opposing ends. Each endcap 120*a*, 120*b* may include a respective attachment ring 107*a*, 107*b* attached thereto. The attachment rings 107*a*, 107*b* may provide a removably attachable means for the left and right extension lines 103 to be attached to the arched vibrational cylinder 101 via the o-ring clasps 104. Each o-ring clasp 104 may include one end with an annulus whereby the extension lines 103, 115 may fixedly attach. The other end of the o-ring clasp 104 may be a clip to removably attach to an object.

Figure 3A:
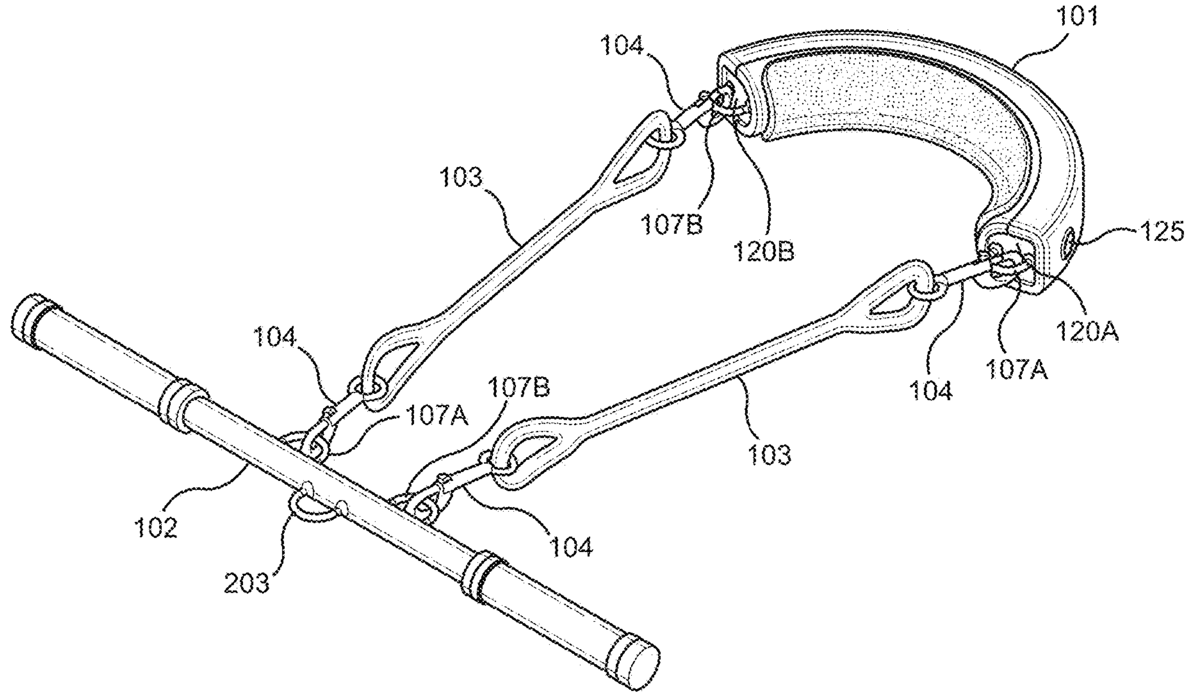
FIG. 3A is a front perspective view of a portion of the modular chiropractic tool illustrated in FIG. 1.
Figure 3B:
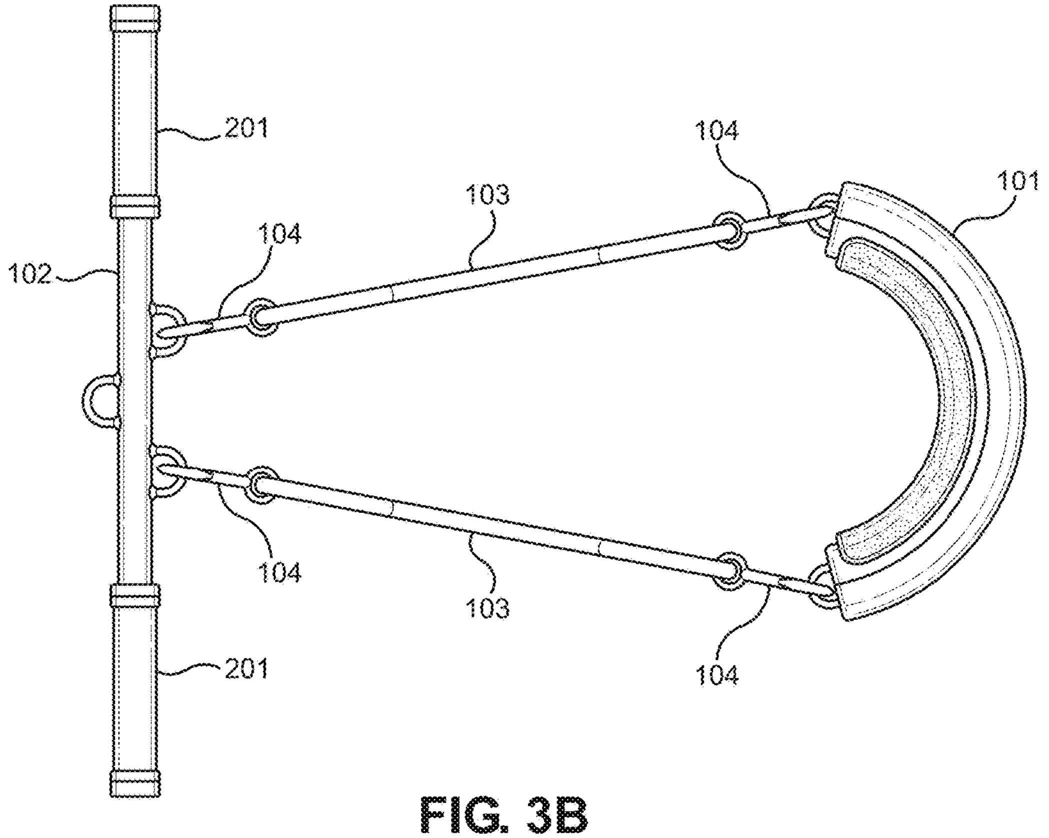
FIG. 3B is a top view of the portion of the modular chiropractic tool illustrated in FIG. 3.
Figure 4A:
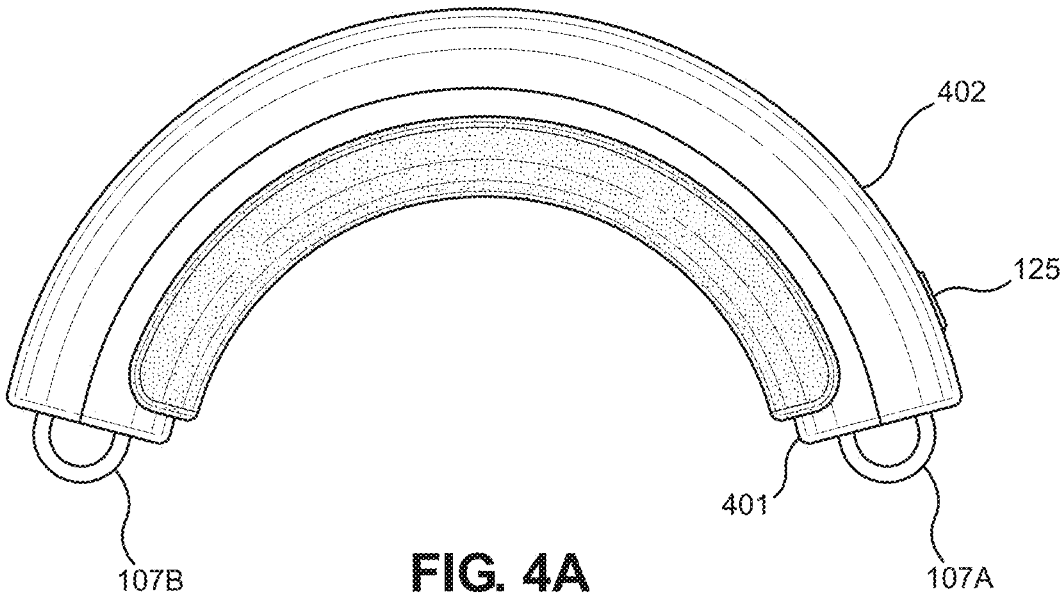
FIG. 4A is a top view of a portion of the modular chiropractic tool illustrated in FIG. 1.
Figure 4B:
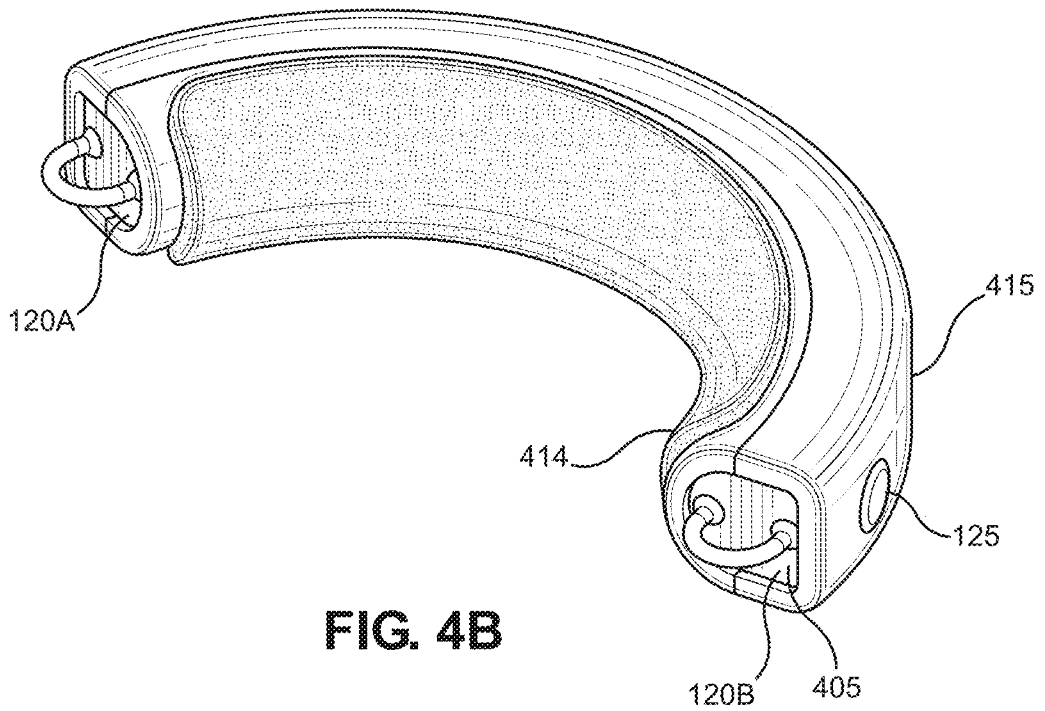
FIG. 4B is a front perspective view of the portion of the modular chiropractic tool illustrated in FIG. 4A.
Figure 4C:
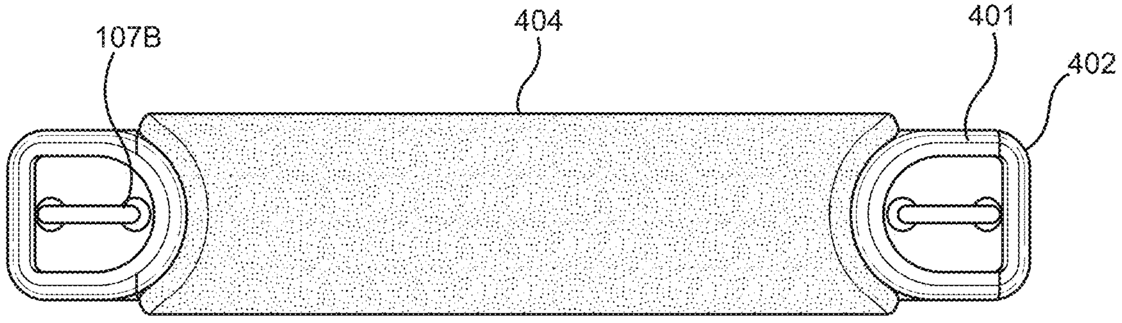
FIG. 4C is a front view of the portion of the modular chiropractic tool illustrated in FIG. 4A.
Figure 5:
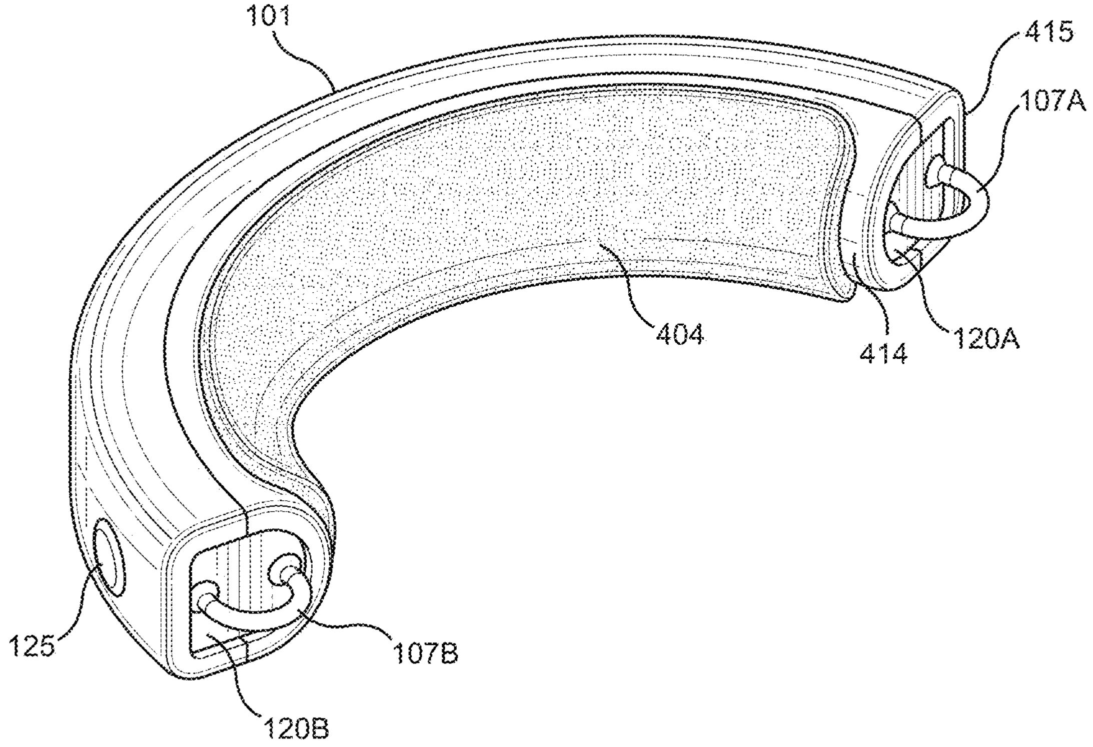
FIG. 5 is a side perspective view of the portion of the modular chiropractic tool illustrated in FIG. 4A.

FIGS. 3A and 3B are a front perspective view and top view respectively of a portion of the tool 100 illustrated in FIG. 1 whereby the medial extension line has been removed and only the gripping bar 102 with left and right extension lines 103 attached to the arched vibrational cylinder 101 remain. As will be described hereinafter, modulating the tool 100 in this manner allows more versatility in how a user may utilize it.

FIGS. 4A, 4B, 4C and 5 show the exterior of the arched vibrational cylinder 101 from several angles. As shown, the arched vibrational cylinder 101 may include an inner shell 401 and an outer shell 402 joined along their longitudinal axes. Together, the inner shell 401 and outer shell 402 may fit together to form the exoskeleton of the arched vibrational cylinder 101. Abutting and fitting overtop the inner shell 401 may be an arched neck pad 404 that may conform to the geometrically arched shape of the arched vibrational cylinder 101.

Also shown are more in-depth views of the endcaps 120A, 120B and their respective attachment rings 107*a*, 107*b*. As such, the endcaps 120A, 120B may fit within end cavities formed by the inner shell 401 and outer shell 402. The endcaps 120A, 120B may resemble rectangles, but with two rounded corners on their outer edge and an arch at their inner edge. This may be emblematic of the overall shape of the arched vibrational cylinder 101 having a flatter back area 415 but a rounder interior area 414. This rounded interior 414 may form a type of beveled edge that may assist with applying the appropriate pressure to a user's neck. Shown as well in these figures is the power button 125 used to actuate the vibrational aspect of the tool 100. However, in some embodiments, there may be a remotely paired device such as a remote control or smart phone application that may actuate and control the tool 100.

Figure 6A:
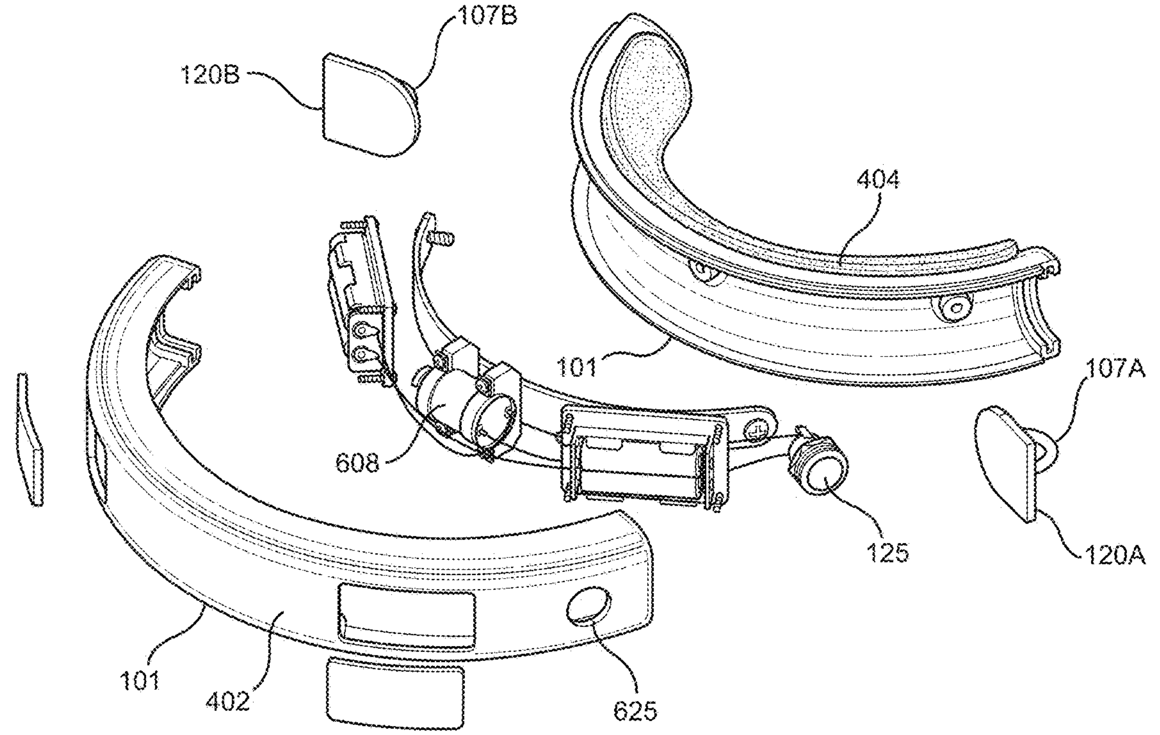
FIG. 6A is an exploded rear perspective view of the portion of the modular chiropractic tool illustrated in FIG. 4A.
Figure 6B:
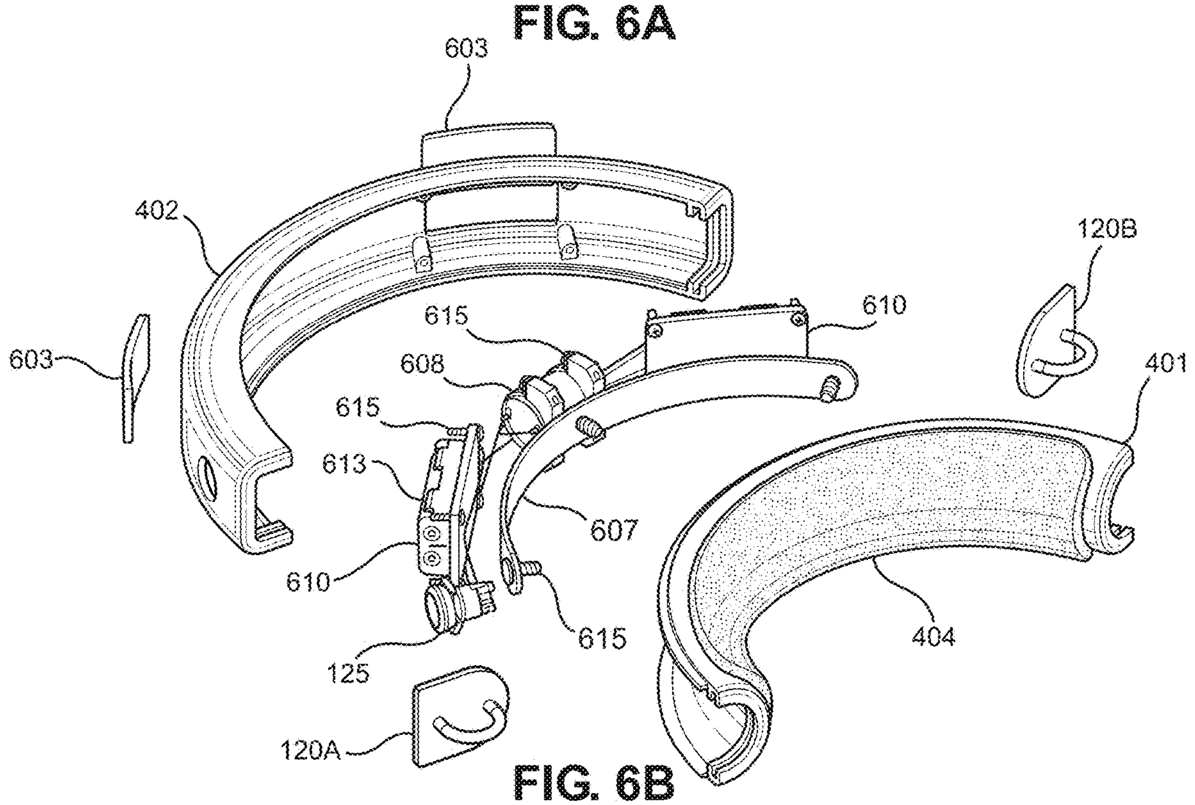
FIG. 6B is an exploded front perspective view of the portion of the modular chiropractic tool illustrated in FIG. 4A.
Figure 7:
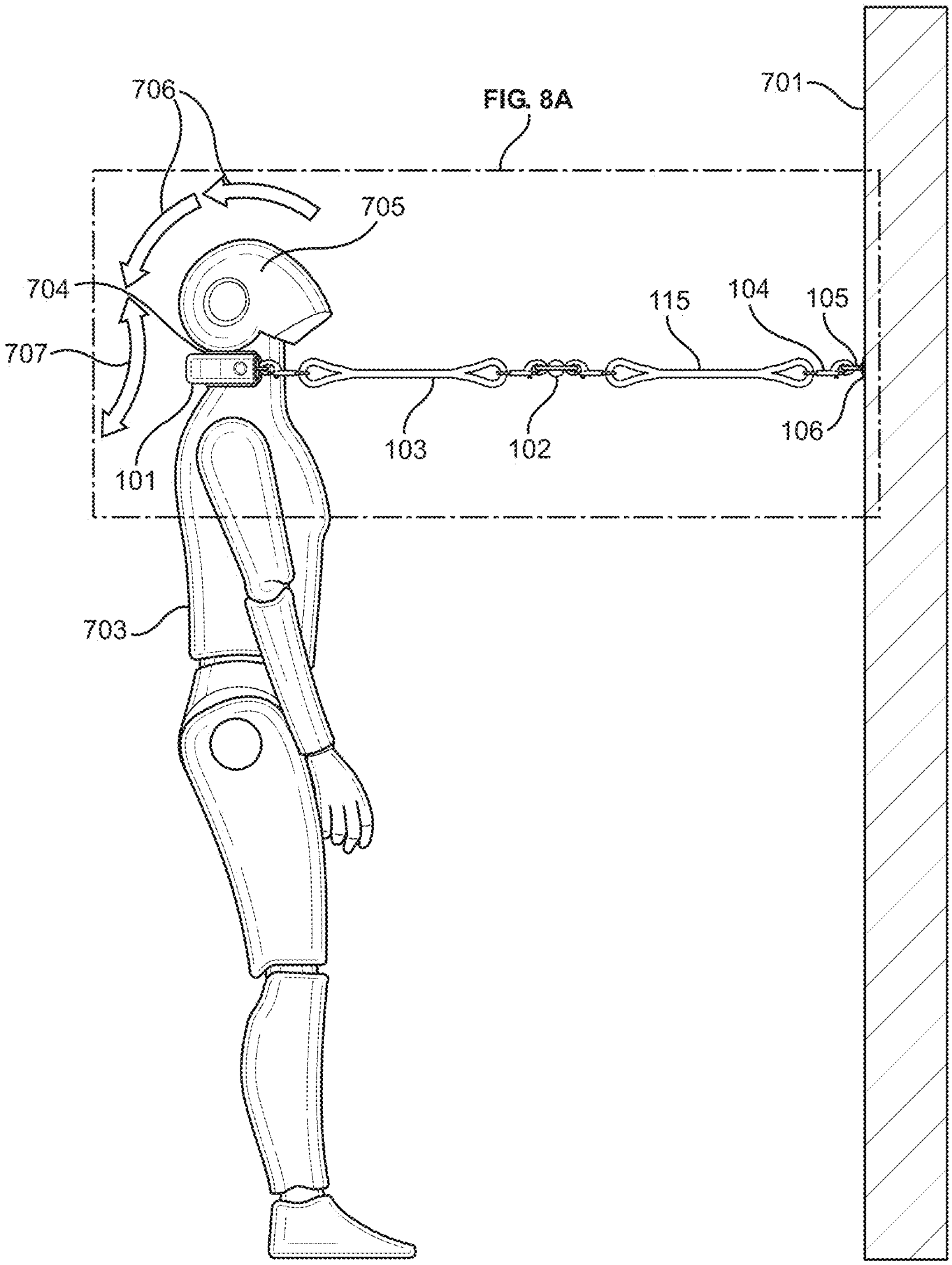
FIG. 7 is an environmental view of the modular chiropractic tool illustrated in FIG. 1.
Figure 8A:
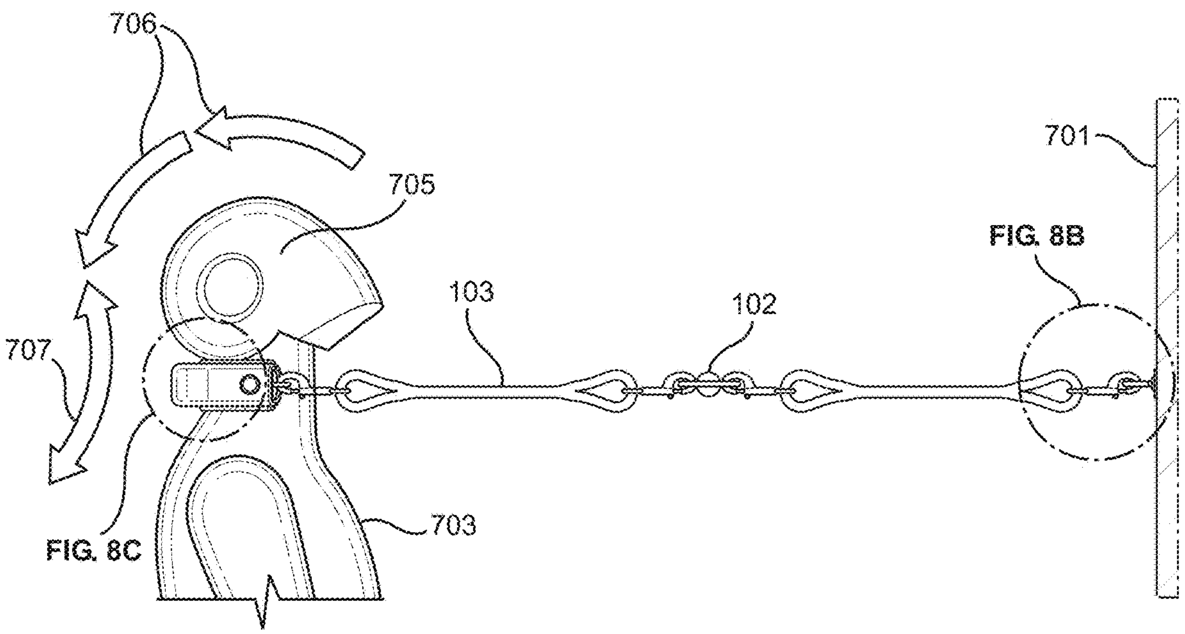
FIG. 8A is an enlarged side view of a segment of the environmental view illustrated in FIG. 7.
Figure 8B:
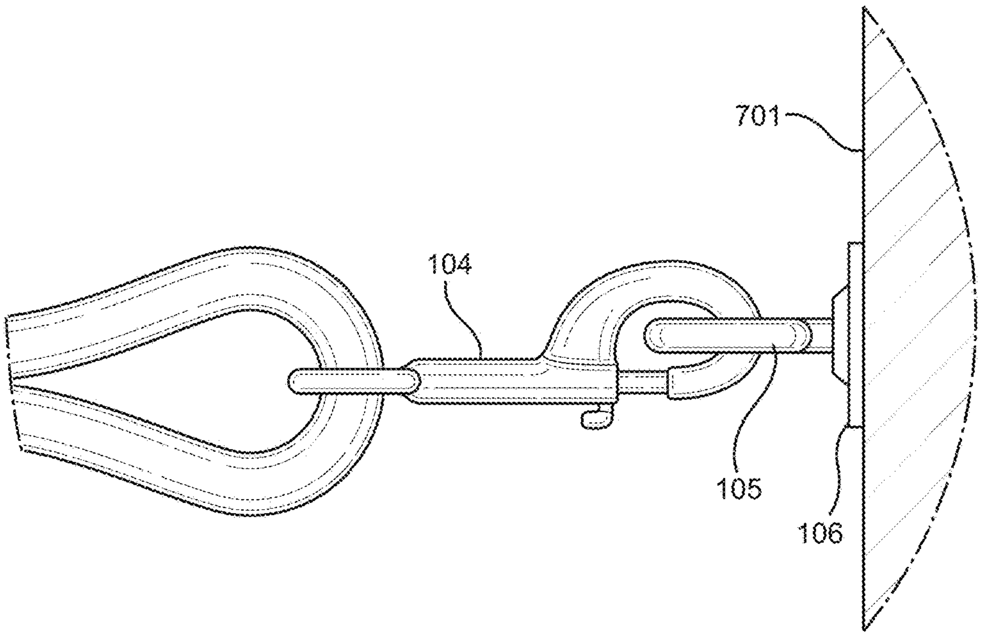
FIG. 8B is an enlarged side view of a segment of the environmental view illustrated in FIG. 8A.
Figure 8C:
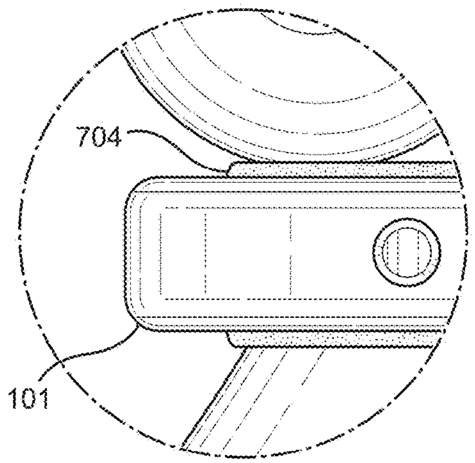
FIG. 8C is an enlarged side view of a segment of the environmental view illustrated in FIG. 8A.
Figure 9:
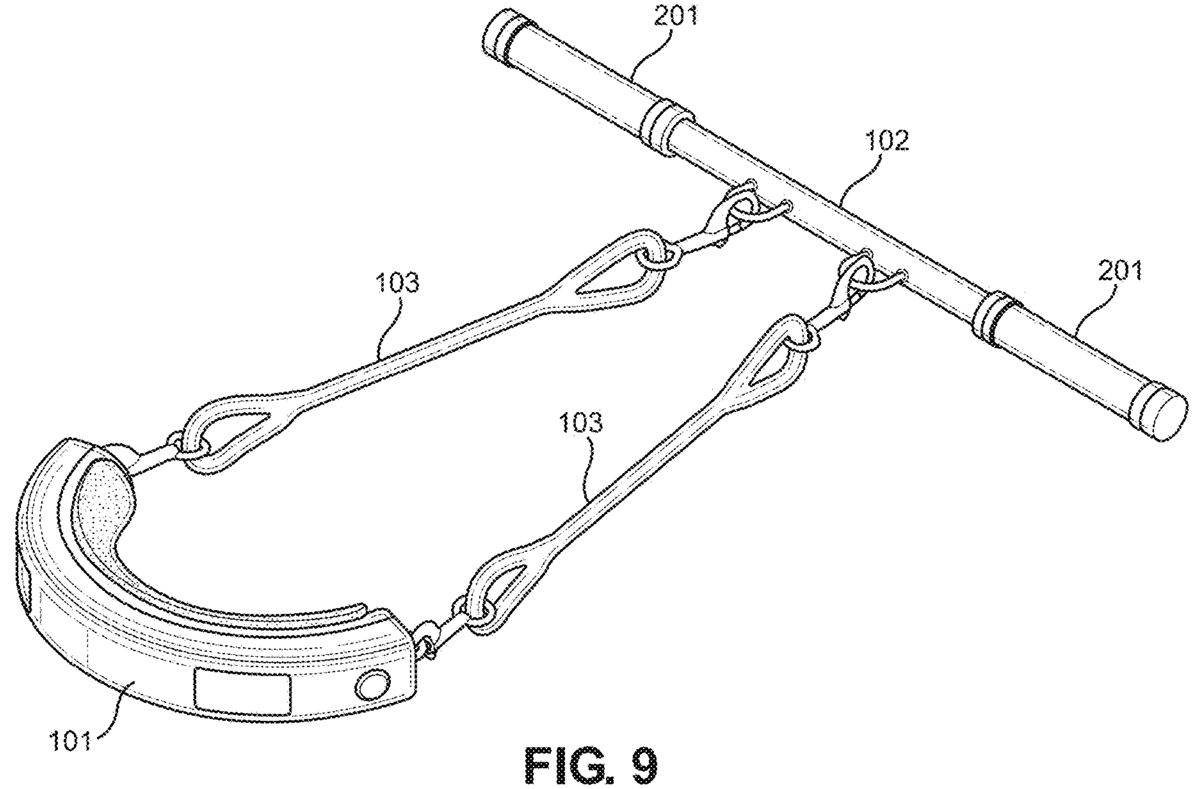
FIG. 9 is a perspective view of the portion of the modular chiropractic tool illustrated in FIG. 3A.
Figure 10A:
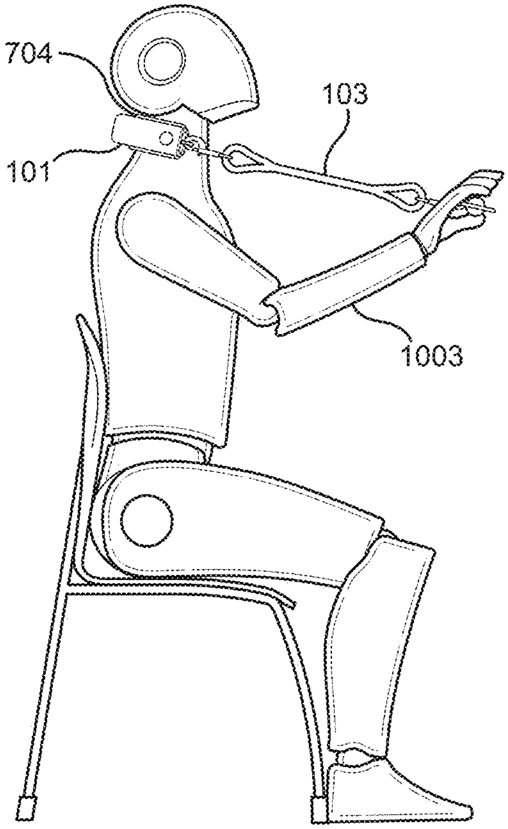
FIG. 10A is an environmental view of a portion of the modular chiropractic tool illustrated in FIG. 3A.
Figure 10B:
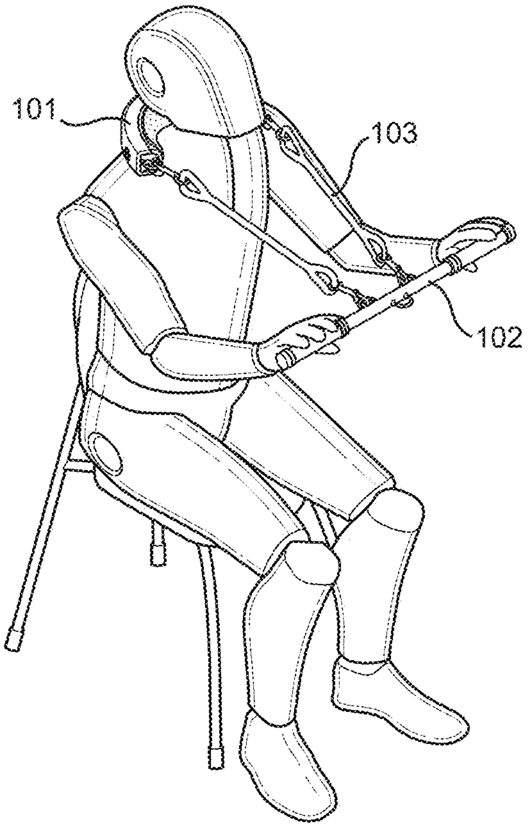
FIG. 10B is an environmental view of a portion of the modular chiropractic tool illustrated in FIG. 3A.
Figure 10C:
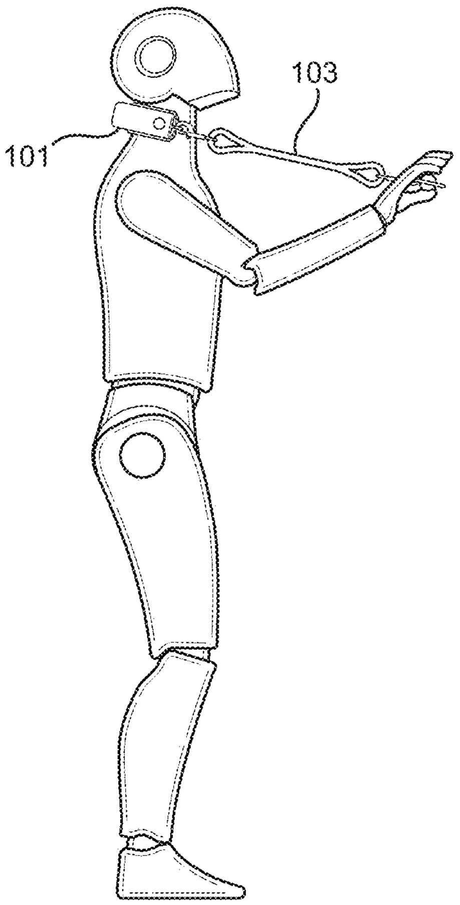
FIG. 10C is an environmental view of a portion of the modular chiropractic tool illustrated in FIG. 3A.

FIGS. 6A and 6B are front and rear exploded views of the arched vibrational cylinder 101 showing the internal and external componentry thereof. As shown, the arched vibrational cylinder 101 may include an inner shell 401 and an outer shell 402 that encapsulate a diffuser platform 607 as well as both electric and nonelectric internal componentry. As such, located on the diffuser platform 607 may be at least one battery housing 610. In some embodiments, there may be two battery housings 610 at opposing longitudinal ends of the diffuser platform 607 structured to hold at least one or a plurality of batteries 613 therein. Centrally located amid the diffuser platform 607 may be a vibrational motor 608. The vibrational motor 608 may be electrically coupled to the batteries 613 and battery housings 610.

The vibrational motor 608 may be located medially on the diffuser platform 607 allowing the vibrations caused by the vibrational motor 608 to be disbursed outward toward each end. However, in some embodiments there may be a plurality of vibrational motors 608 positioned along the diffuser platform 607. The arched nature of the diffuser platform 607 and the fact that it contours the interior of the inner shell 402 causes vibrations to be disbursed throughout the inner shell and the entire arched vibrational cylinder 101. The diffuser platform 607 may be removably attached to the inner shell 401 via plurality of fasteners such as screws 615. However, in some embodiments it may be attached via adhesive, friction fit, or the like.

The vibrational motor 608 may be actuated by the power button 125 which may permeate through the outer shell 402 via passthrough 625. Likewise, the batteries 613 may be accessed through the outer shell 402 via removably engaged battery covers 603 enclosing passthroughs on the outer shell 402.

In some embodiments, the arched vibrational cylinder 101 may itself be slightly flexible to accommodate the curvature around a user's neck and lower head. However, in other embodiments, the arched vibrational cylinder 101 may be a rigid object. In some embodiments, the arched vibrational cylinder 101 may be curved from the tension applied by the left and right extension lines 103 at either end. In other embodiments, the arched vibrational cylinder 101 may already include a rigid curve.

FIGS. 7, 8A, 8B, and 8C illustrate the tool 100 being used by a user 703 for traction. These figures show how the tool may be attached to a wall 701 with the mounting assembly shown specifically in FIG. 8B. The attachment may be effectuated by the mounting plate 106 being securely attached to a wall 701. The mounting ring 105 fixedly attached to the mounting plate 106 may allow for the o-ring clip 104 to connect the medial extension line 115. In this embodiment, the user 703 may be standing or seated in a chair and the vibrational cylinder 101 may be secured around the back of the user's neck 704. In this position, the user 703 does not need to utilize the gripping bar 102 in order to use the tool 100. Here, the user 703 may position themselves at a distance from the wall 701 whereby the medial extension line 115 and the left and right extension lines 103 are pulled tight and the vibrational cylinder 101 is curved around the user's neck 704. The user 703 may then pull in a direction opposing the wall 701 and may move their head back and forth over the arched vibrational cylinder 101 as shown by movements 706, while pulling the arched vibrational cylinder 101 up and down the user's spine 707. This tipping motion 706, 707 may also mimic the ideal position for the cervical spine at a 45-degree curve. The motion 706, 707 may also assist with training a user's spine and aid with reversing damage done from poor posture from daily technology use.

FIGS. 9, 10A, 10B, and 10C illustrate the tool 100 with medial extension line 115 removed and demonstrate how a user 703 may use the tool 100 for traction in this configuration. As shown, a user 703 may utilize the tool 100 with the handgrips 201 of the gripping bar 102. In other words, the gripping bar 102 may be structured to allow a user to utilize the tool 100 with their hands while it is disconnected from a wall. The versatility of the tool 100 is shown as it may be used in a seated or standing position without being attached to a vertical surface. Here, the user 703 may still have the vibrational cylinder 101 placed around the back of their neck 704, but may utilize the gripping bar 102 to pull the left and right extension lines 103 tight by extending their arms 1003. Here the user 203 may use their arms 301 in conjunction with slight movement of their head 705 to move the tool 100 up and down the user's neck 204 and head 205 as well as to tip their head back and forth over the vibrational cylinder 101.

Figure 11:
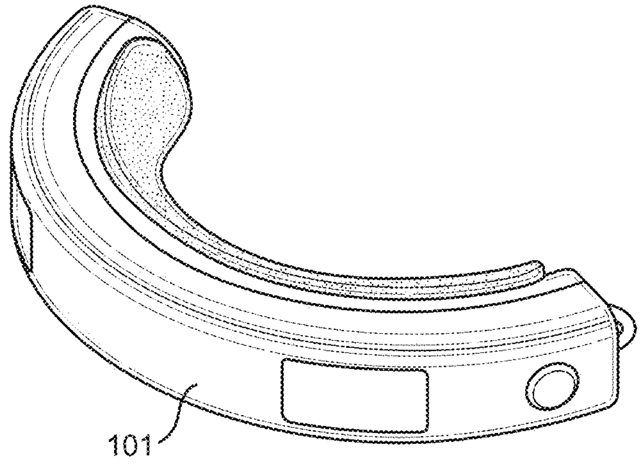
FIG. 11 is a rear perspective view of the portion of the modular chiropractic tool illustrated in FIG. 4A.
Figure 12:
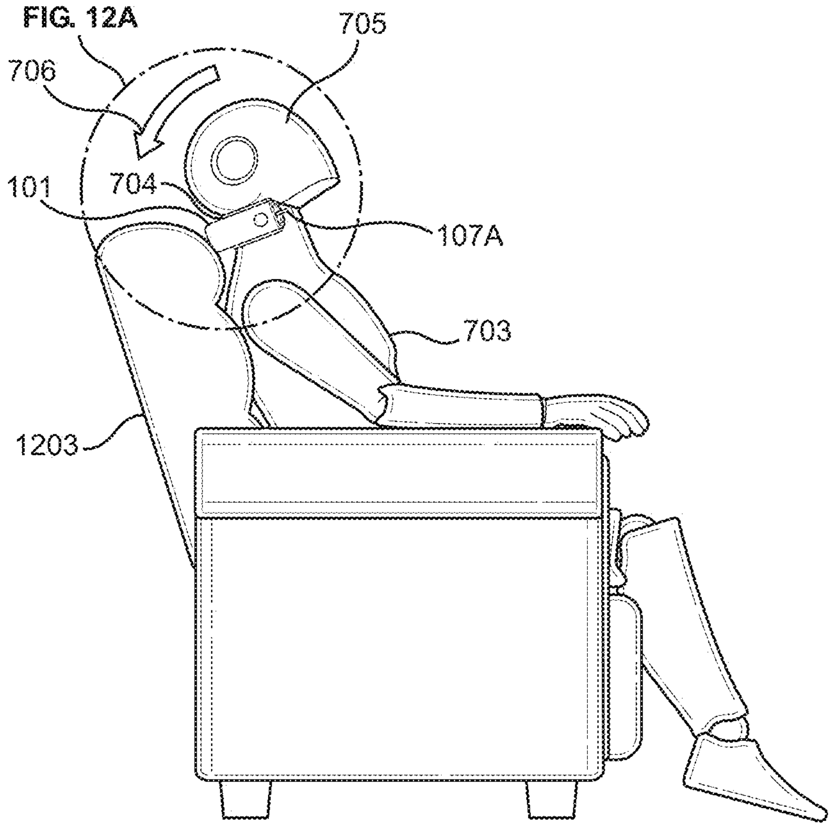
FIG. 12 is an environmental view of the portion of the modular chiropractic tool illustrated in FIG. 11.
Figure 12A:
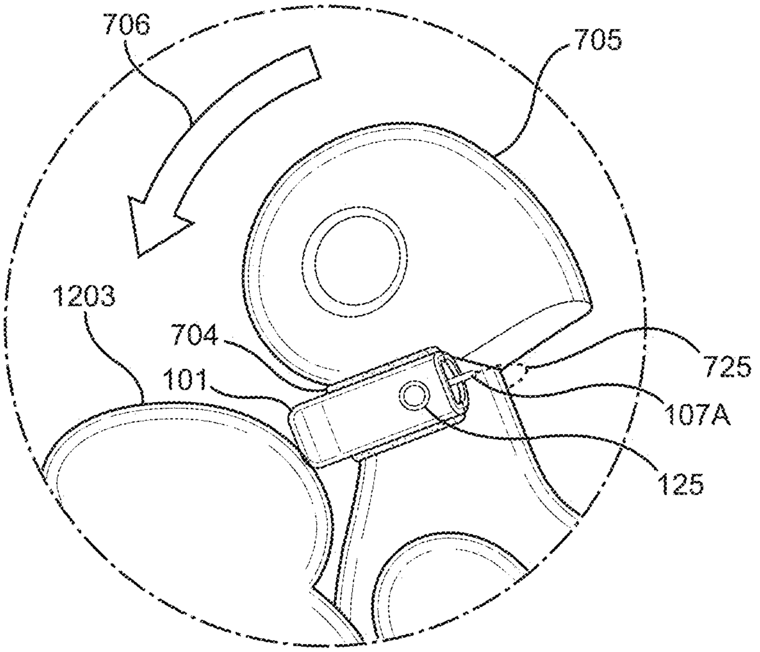
FIG. 12A is an enlarged side view of a segment of the environmental view illustrated in FIG. 12.

FIGS. 11, 12 and 12A further illustrate the versatility of the tool 100 as well as highlight its modular nature. It demonstrates how the arched vibrational cylinder 101 may be utilized as a stand-alone hands-free chiropractic tool when disconnected from the wall 701 and the gripping bar 102. These figures show the tool 100 with both the medial extension line 115 and the right and left extension lines 103 removed. Therefore, the tool 100 is reduced to the arched vibrational cylinder 101 for therapy. As shown, the tool 100 may be used in a reclining type position whereby the user 703 may be seated in a comfortable chair 1203 and the right and left extension lines 103 have been detached from the vibrational cylinder 101. In some embodiments, the vibrational cylinder 101 may be secured to itself around a user's neck 704 at the front by an attachment rope 725 removably clasped to the attachment rings 107*a*, 107*b* on each endcap 120*a*, 120*b*. In other embodiments the user 703 is able to use the curvature of the arched vibrational cylinder 101 alone to hold it in place on the user's neck 704.

As illustrated, the user 703 is simply using the vibrational cylinder 101 as a massaging means to relax their neck 704 and head 705 as the vibrational cylinder 101 is vibrating. The user 703 may also perform slight tipping movement 706 of their head 705 back and forth over the vibrational cylinder 101 as demonstrated by the other figures. This may be the same movement shown in FIGS. 7 and 8A as 706 and 707.

That which is claimed is:

1. A modular chiropractic tool comprising:

an arched vibrational cylinder comprising a rigid arched inner shell and a rigid arched outer shell and two opposing ends each comprising an end cap and attachment ring;

an arched diffuser platform positioned within a cavity formed by the rigid arched inner shell and the rigid arched outer shell;

at least one vibrational motor and at least one power source located on the arched diffuser platform configured to vibrate the vibrational cylinder;

a gripping bar;

a wall mount;

a left extension line comprising a first O-ring clip at one end of the left extension line and a second O-ring clip on an opposite end of the left extension line and a right extension line comprising a third O-ring clip on a first end of the right extension line and a fourth O-ring clip on an opposite end of the right extension line; and a medial extension line comprising a fifth O-ring clip on one end of the medial extension line and a sixth O-ring clip on an opposite end of the medial extension line;

wherein an inner surface of the rigid arched inner shell is convex and beveled and configured to contact a portion of the user's neck;

wherein the beveled surface extends from one end portion of the rigid arched inner shell to a second end portion of the rigid arched inner shell;

wherein the left extension line and right extension line removably engage the arched vibrational cylinder at one end via the first O-ring clip and the third O-ring clip, respectively, and removably engage the gripping bar at the two opposing ends via the second O-ring clip, the fourth O-ring clip, and each of the attachment rings;

wherein the medial extension line is removably engaged to the gripping bar at one end via the fifth O-ring clip and removably engaged to the wall mount at an opposing end via the sixth O-ring clip; and wherein the modular chiropractic tool is configured to assist the user in a variety of vibrational adjustment exercises applied to the user's neck and upper spine.

2. The modular chiropractic tool of claim 1 wherein the wall mount is configured to allow the user to utilize the modular chiropractic tool in a hands-free exercise while connected to a wall.

3. The modular chiropractic tool of claim 1 wherein the gripping bar is configured to allow the user to utilize the modular chiropractic tool with their hands while it is disconnected from a wall.

4. The modular chiropractic tool of claim 1 wherein the arched vibrational cylinder is configured as a stand-alone hands-free chiropractic tool when disconnected from a wall and the gripping bar.

5. The modular chiropractic tool of claim 1 wherein the medial extension line is removably engaged to an attachment ring centrally positioned on the gripping bar and the left and right extension lines are removably engaged to a pair of flanking attachment rings oriented 180 degrees around the gripping bar from the centrally positioned attachment ring.

6. The modular chiropractic tool of claim 1 wherein the gripping bar includes a pair of grips at opposing ends.

7. A modular chiropractic tool comprising:

an arched vibrational cylinder comprising a rigid arched inner shell and a rigid arched outer shell and two opposing ends each comprising an end cap and attachment ring;

an arched diffuser platform positioned within a cavity formed by the rigid arched inner shell and the rigid arched outer shell;

at least one vibrational motor and at least one power source located on the arched diffuser platform configured to vibrate the vibrational cylinder;

a gripping bar;

a wall mount;

a left extension line comprising a first O-ring clip at one end of the left extension line and a second O-ring clip on an opposite end of the left extension line and a right extension line comprising a third O-ring clip on a first end of the right extension line and a fourth O-ring clip on an opposite end of the right extension line; and a medial extension line comprising a fifth O-ring clip on one end of the medial extension line and a sixth O-ring clip on an opposite end of the medial extension line;

wherein an inner surface of the inner shell is convex and beveled and configured to contact a portion of the user's neck;

wherein the convex and beveled inner surface extends from one end portion of the rigid arched inner shell to a second end portion of the rigid arched inner shell;

wherein the medial extension line is removably engaged to the gripping bar at one end via the fifth O-ring clip and removably engaged to the wall mount at an opposing end via the sixth O-ring clip;

wherein the left extension line and right extension line removably engage the arched vibrational cylinder at one end via the first O-ring clip and the third O-ring clip, respectively, and removably engage the gripping bar at the two opposing ends via the second O-ring clip, the fourth O-ring clip, and each of the attachment rings;

wherein the wall mount is configured to allow the user to utilize the modular chiropractic tool in a hands-free exercise while connected to a wall;

wherein the gripping bar is configured to allow the user to utilize the modular chiropractic tool with their hands while it is disconnected from a wall; and wherein the arched vibrational cylinder is configured as an independent hands-free chiropractic tool when disconnected from the wall and the gripping bar.

8. The modular chiropractic tool of claim 7 wherein the arched vibrational cylinder includes the rigid arched inner shell and the rigid arched outer shell configured to encapsulate electrical componentry positioned therebetween.

9. The modular chiropractic tool of claim 7 wherein the arched vibrational cylinder may be controlled by either a power button located thereon or communication with a remotely paired wireless device.

10. A modular chiropractic tool comprising:

an arched vibrational cylinder comprising an rigid arched inner shell with a beveled surface, an rigid arched outer shell with a flat surface, two opposing ends each comprising an end cap and attachment ring;

an arched diffuser platform positioned within a cavity formed by the rigid arched inner shell and the rigid arched outer shells, at least one power source positioned on the arched diffuser platform, at least one vibrational motor positioned on the arched diffuser platform, a gripping bar;

a wall mount;

a left extension line comprising a first O-ring clip at one end of the left extension line and a second O-ring clip on an opposite end of the left extension line and a right extension line comprising a third O-ring clip on a first end of the right extension line and a fourth O-ring clip on an opposite end of the right extension line; and a medial extension line comprising a fifth O-ring clip on one end of the medial extension line and a sixth O-ring clip on an opposite end of the medial extension line;

wherein the beveled surface of the rigid arched inner shell is convex and configured to contact a portion of the user's neck;

wherein the rigid arched inner shell includes a neck pad fitted over the inner surface of the rigid arched inner shell and the neck pad comprises a convex inner surface having a concave profile forming a neck accommodating space;

wherein the convex inner surface extends from one end portion of the rigid arched inner shell to a second end portion of the rigid arched inner shell;

wherein the medial extension line is removably engaged to the gripping bar at one end via the fifth O-ring clip and removably engaged to the wall mount at an opposing end via the sixth O-ring clip;

wherein the left extension line and right extension line removably engage the arched vibrational cylinder at one end via the first O-ring clip and the third O-ring clip, respectively, and removably engage the gripping bar at the two opposing ends via the second O-ring clip, the fourth O-ring clip, and each of the attachment rings; and wherein the modular chiropractic tool is configured to assist the user in a variety of vibrational adjustment exercises applied to the user's neck and upper spine.

11. The modular chiropractic tool of claim 10 wherein the wall mount is configured to allow a user to utilize the modular chiropractic tool in a hands-free exercise while connected to a wall; and wherein the gripping bar is configured to allow a user to utilize the modular chiropractic tool with their hands while it is disconnected from a wall.

12. The modular chiropractic tool of claim 10 wherein the arched vibrational cylinder is configured as an independent hands-free chiropractic tool when disconnected from the wall and the gripping bar.

* * * * *